United States Patent

English et al.

[11] Patent Number: 6,111,241
[45] Date of Patent: Aug. 29, 2000

[54] SEMI-ACTIVE LASER LAST PULSE LOGIC SEEKER UTILIZING A FOCAL PLANE ARRAY

[75] Inventors: James E. English, Madison; Ronald O. White, Huntsville; James L. Springer, Hampton Cove; Raymond W. Schneider, Huntsville, all of Ala.

[73] Assignee: The United States of America as represented by the Secretary of the Army, Washington, D.C.

[21] Appl. No.: 09/207,899

[22] Filed: Nov. 24, 1998

[51] Int. Cl.[7] .............................. G01C 3/08; G01S 17/66
[52] U.S. Cl. ........................................ 250/203.2; 356/4.01
[58] Field of Search .............................. 250/203.1, 203.2, 250/203.3, 203.6, 216, 214 R, 206.1, 206.2; 356/4.01, 4.03, 4.05, 5.03, 5.08

[56] References Cited

U.S. PATENT DOCUMENTS 5,780,839   7/1998   Livingston ........................... 250/203.2

*Primary Examiner*—Seungsook Ham
*Assistant Examiner*—Kevin Pyo
*Attorney, Agent, or Firm*—Arthur H. Tischer; Freddie M. Bush; Hay Kyung Chang

[57] ABSTRACT

The semi-active laser (SAL) last pulse logic seeker utilizing a focal plane array is obtained by combining the semi-active laser last pulse logic signal processing using a single PIN photodiode with a staring imaging infrared ($I^2R$) focal plane array detector, such as InSb. The result is an improvement that renders the seeker capable of operating in three different modes: SAL only, $I^2R$ only or simultaneous multi-spectral processing in SAL/$I^2R$. The improvement uses a single PIN photodiode detector with an imaging infrared focal plane array ($I^2R$ FPA) detector to correlate the temporal laser returns of the former with the spatial laser returns of the latter which enables the SAL last pulse return, indicative of the true target, to be identified on the $I^2R$ FPA. To facilitate the correlation process, the FPA can be divided into regions-of-interest (ROI) that are analyzed to determine which temporal laser pulse falls in which particular ROI. Single PIN photodiode detector 101 has the same field-of-view as $I_2R$ FPA detector 111 so that each detector observes the same scene. The laser pulses collected by both detectors are correlated to identify the particular ROI on the FPA on which the last pulse falls, thus the location of the target, and the missile is guided to the laser spot on that particular ROI for a more accurate and direct impact on the target.

10 Claims, 4 Drawing Sheets

I²R FPA

PIN PHOTODIODE

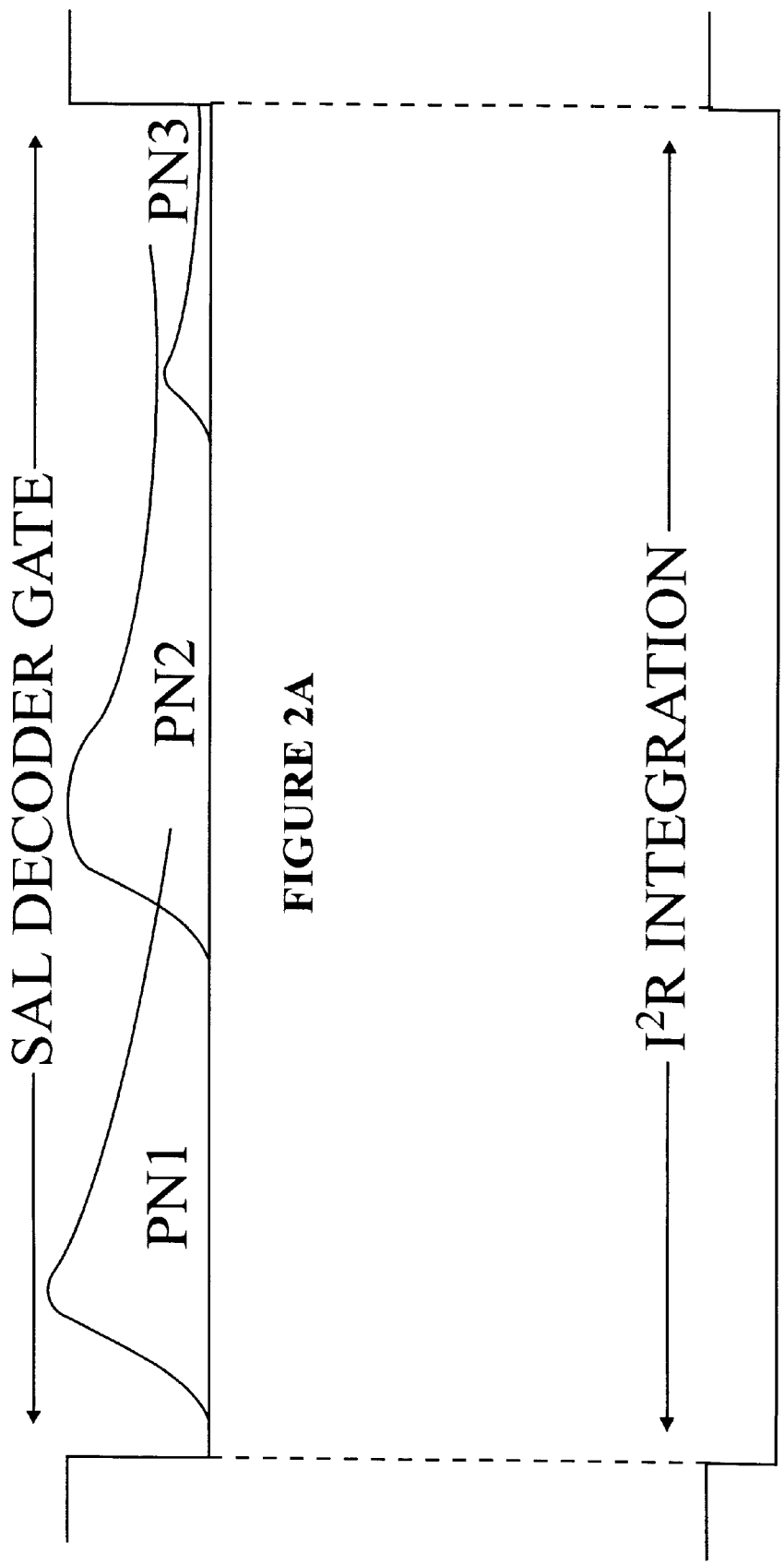

SEMI-ACTIVE LASER LAST PULSE LOGIC SEEKER UTILIZING A FOCAL PLANE ARRAY

DEDICATORY CLAUSE

The invention described herein may be manufactured, used and licensed by or for the Government for governmental purposes without the payment to us of any royalties thereon.

BACKGROUND OF THE INVENTION

The conventional Hellfire missile seeker acquires (locates) a target in a given scene by the use of a four-quadrant PIN photodiode detector to detect, in temporal sequence, the laser pulses that are reflected by the target upon being illuminated by a laser designator. FIG. 1 illustrates a typical setting for such Hellfire seeker use. These temporally-detected pulses exist in the near infrared (1.06 micrometer) spectral band and are processed in accordance with the well-known principle of semi-active laser (SAL) last pulse logic (LPL). The SAL Hellfire seeker acquires the designated target by analyzing the reflected laser pulse returns that are detected by the photodiode detector, generating a decoder gate and further analyzing the laser pulse returns which occur inside this gate to find the last laser pulse that is representative of the designated target. To wit, a detection threshold based on pulse amplitude of the received laser pulses is established by the pulse discriminator 107 and sample-and-hold 105. Upon receipt of the first temporally detected laser pulse from photodiode detector 101, a detection threshold based on the amplitude of the first pulse normalizer pulse, PN1, is established. This threshold decays at a constant rate. Only laser pulses among those detected by the photodiode detector which break this decaying threshold, as illustrated in FIG. 2A, are determined to be viable target laser pulses and the last pulse breaking the threshold is deemed to be the correct or true target laser pulse. Within the semi-active laser decoder gate, shown in FIG. 2A, which is established based on pulse repetition frequency codes, three laser pulse returns are shown any of which may have originated from an active source. Of the three pulse returns, only two break the threshold and the second pulse normalizer pulse, PN2, is identified by the photodiode detector as the last pulse. Also well-known is the technology of midwave (3–5 micrometers) imaging infrared ($I^2R$) staring focal plane array (FPA) which can respond down to the near infrared (IR) at 1.06 micrometers. Various detector materials such as indium antimonide (InSb) and mercury cadmium telluride (MCT) are viable candidates for the FPA. Suitable InSb FPA's are available from, among others, Amber and Cincinnati Electronics and MCT FPA's may be obtained from the Boeing Company.

Attempts have been made previously to combine the semi-active laser (SAL) and the imaging infrared ($I^2R$ FPA) guidance concepts to create a dual-mode system where each waveband, independently of each other, processes scene information for targets within the target scene and generates guidance commands for guiding the missile after identifying the true target to track. In such a system, each waveband may complement the other to help acquire the true target but there is no spatial/temporal correlation of target information between the two different wavebands.

SUMMARY OF THE INVENTION

The semi-active laser last pulse logic seeker utilizing a focal plane array combines the semi-active laser last pulse logic, as presently performed in the traditional Hellfire missile seeker, with a staring imaging infrared focal plane array detector, such as InSb, to result in an improvement in the seeker performance that enables the seeker to operate in three different modes: SAL only, $I^2R$ only or simultaneous multi-spectral processing in SAL/$I^2R$. This operational versatility is obtained while retaining the last pulse logic signal processing currently available in the Hellfire SAL seeker.

The improvement uses a single PIN photodiode detector with an imaging infrared focal plane array ($I^2R$ FPA) detector to correlate the temporal laser returns of the former with the spatial laser returns of the latter which enables the SAL last pulse return, indicative of the true target, to be identified on the $I^2R$ FPA. To facilitate the correlation process, the FPA may be divided into regions-of-interest (ROI) that are analyzed to determine which temporal laser pulse falls in a particular ROI. Single PIN photodiode detector 101 has the same field-of-view as $I^2R$ FPA detector 111 so that each detector observes the same scene. The PIN photodiode detector detects temporally the laser pulses in the near IR (1.06 micrometers) reflected by a target scene and selects the last pulse which is indicative of the true target, just as the process is performed by the traditional Hellfire seeker, and the $I^2R$ FPA detects spatially the same reflected laser pulses as well as midwave infrared (3–5 micrometers) energy that falls on the FPA. The laser pulse data collected by both detectors are correlated to identify the particular ROI on which the last pulse falls, thus the location of the target, and the missile is guided to the laser spot on that particular ROI for a more accurate and direct impact on the target.

DESCRIPTION OF THE DRAWING

FIG. 2A shows the semi-active laser decoder gate and the pulse detection threshold.

FIG. 2B shows the integration time period for the imaging infrared focal plane array.

DESCRIPTION OF THE PREFERRED EMBODIMENT

Figure 1:
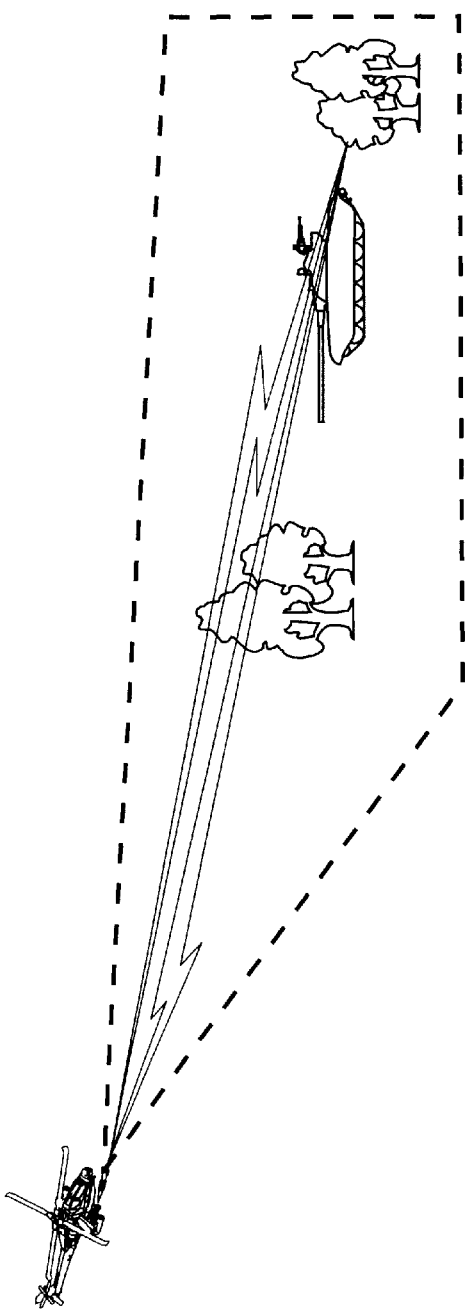
FIG. 1 is a depiction of a typical setting in which the improved seeker can be put to use.

Referring now to the drawing wherein like numbers represent like parts in each of the several figures, the structure and operation of the semi-active laser last pulse logic seeker utilizing a focal plane array are explained in detail.

Figure 5:
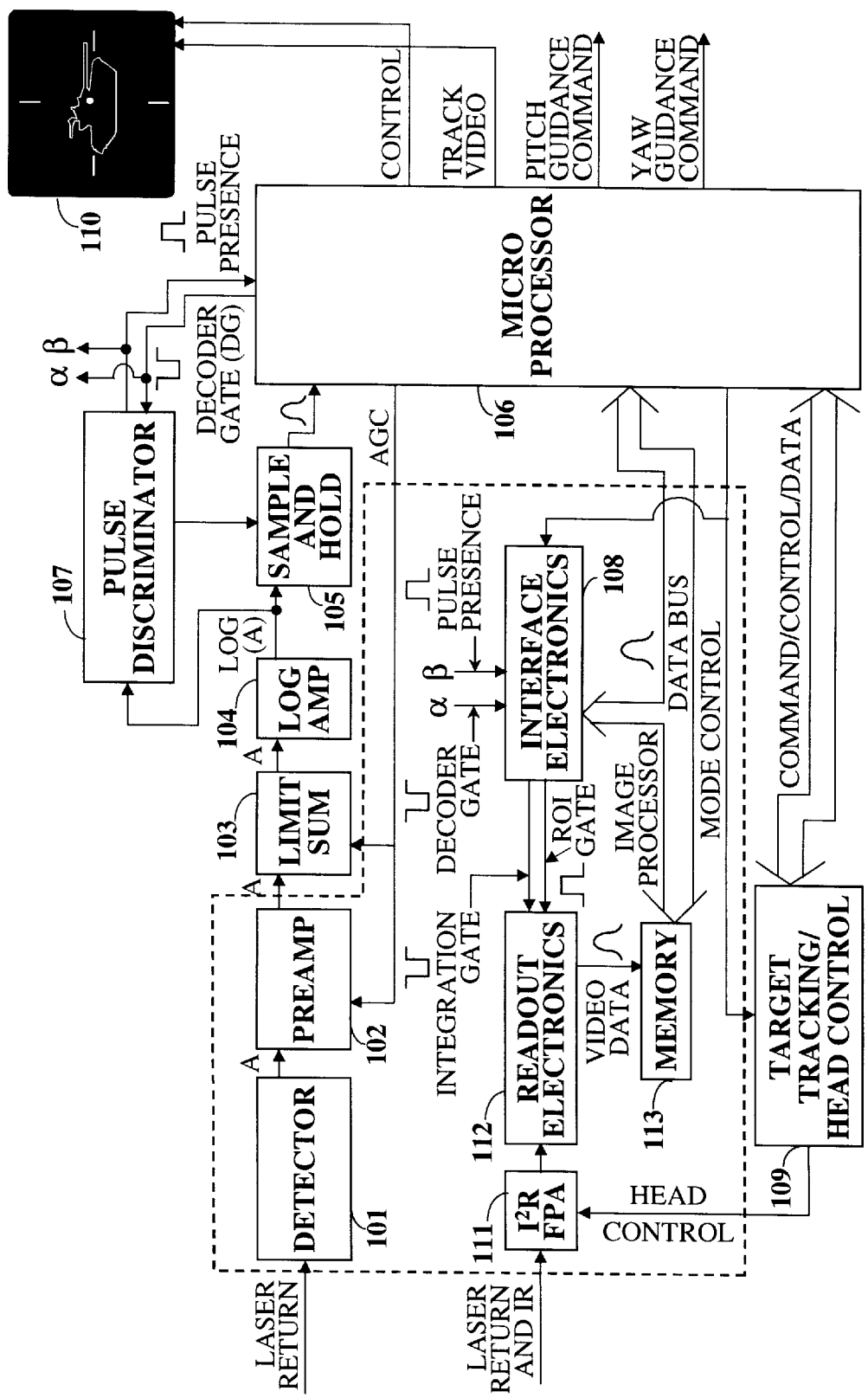
FIG. 5 is a diagram of the preferred embodiment of the semi-active laser last pulse logic seeker utilizing a focal plane array.

FIG. 1 depicts a typical scenario for application of the improved seeker. It shows airborne laser designation of the potential target from a helicopter but ground designation works just as well. FIG. 2A illustrates Hellfire semi-active laser (SAL) decoder gate which is determined based on a pre-selected pulse repetition frequency (PRF) codes and shows three laser pulses temporally detected by the PIN photodiode detector. For the instant invention, PIN photodiode detector 101, shown in FIG. 5, is not a four-quadrant detector as used in the traditional Hellfire missile seeker but a single PIN detector which requires, correspondingly, only one signal processing channel as opposed to four. The reason is that guidance commands need not be generated from the single PIN detector. It is used only to detect the laser pulses and determine the last pulse for both the acquisition mode and the track mode of the missile seeker. In addition to offering more options in the packaging, optical design and signal processing electronics of the missile seeker, the use of single PIN detector provides better sensitivity over the four-quadrant version because sensitivity is related to the detector area and the laser spot is focused rather than defocused as it is on the four quadrant detector.

Figure 4:
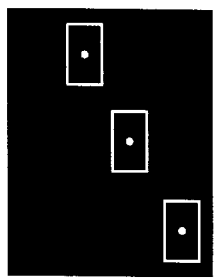
FIG. 4 depicts the three laser pulses spatially detected by the imaging infrared focal plane array.
Figure 3:
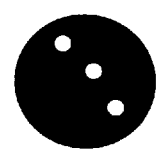
FIG. 3 depicts the three laser pulses temporally detected by the single PIN photodiode detector.

A pulse detection (dynamic) threshold is established by pulse discriminator 107 based on the amplitude of the first pulse normalizer pulse, PN1, which threshold decays at a given constant rate. Only those pulses that break this decaying threshold are determined by the LPL photodiode detector to be viable target pulse returns. The last pulse to break the threshold is deemed to be indicative of the true target and the one to be tracked. FIG. 2A shows three pulse returns within the SAL decoder gate of which only two break the threshold and PN2 is identified as the LPL return. These same three pulses are also detected spatially by $I^2R$ FPA 111 as illustrated in FIG. 4. A suitable $I^2R$ FPA such as an Amber InSb array having a frame time of 33 milliseconds (frame rate of 30 Hz) allows variable integration times and accessibility to various parts (regions of interest—ROI) of the array within a given frame time. In any one frame, the entire array is looked at to determine how many laser pulses exist, if any. Any spatially detected pulses are compared to the pulses detected by single PIN photodiode detector 101. If the integration time, shown in FIG. 2B, of the $I^2R$ FPA has been properly controlled to coincide with the duration of the temporal detection of pulses by the single PIN photodiode detector, then the number of pulses detected by each of the detectors is the same. However, at this stage, there is no correlation or indentification between the pulses detected by the two detectors, merely the fact that each detector has detected three pulse returns. The correlation necessary to identify the last pulse with a particular ROI of the $I^2R$ FPA is explained below with reference to FIG. 5, where the improvement is included within the dashed lines.

When temporal detection of 1.06-micrometer laser pulses (denoted by "A" in FIG. 5) by single PIN photodiode detector 101 occurs, the detected pulses are subsequently processed by preamplifier 102, limit sum 103 and log amplifier 104 and input to pulse discriminator 107. The discriminator, in conjunction with sample-and-hold 105, establishes the pulse detection threshold based on the amplitude of the first temporally detected pulse and produces a pulse presence signal (pulse normalizer pulse), indicated by β in FIG. 5, which is input to microprocessor 106. The microprocessor, in response, generates a decoder gate, indicated by α. This decoder gate information is input to the discriminator to capture the 1.06-micrometer laser pulses at pre-set times and to interface electronics 108 (along with pulse presence signals representative of laser pulse returns occuring within the decoder gate) where it is used to generate integration gate to command the $I^2R$ FPA to collect imagery and an ROI gate (trigger) to perform the spatial-temporal pulse correlation. Read-out electronics 112 controls the $I^2R$ FPA and, on receipt of the integration gate from the interface electronics, activates the $I^2R$ FPA to view the scene and collect data. All laser pulses that are reflected by the scene for the duration of the integration gate are detected. An Amber InSb or Boeing MCT focal plane array can be controlled by the integration gate to collect laser pulses and the integration gate can be varied in duration by the ROI gate, generated from the temporally detected pulses within the decoder gate, to stop the FPA from further viewing the scene. To be more specific: on the first decoder gate after target acquisition, the FPA views the scene for the duration of the integration gate and collects all laser pulses occurring within the integration gate. Microprocessor 106, then, determines where on the $I^2R$ FPA these laser pulses occur and creates ROI's to be evaluated on successive decoder as well as integration gates. The integration gate, after the first decoder gate, is controlled by the ROI trigger to correlate the spatial and temporal laser pulse returns.

In our illustration, three pulses (PN1, PN2, PN3) are detected within the decoder gate. The first pulse to be viewed by the FPA is PN1 since it occurs first temporally and is detected by PIN photodiode detector 101. After due processing, an ROI gate is generated by the interface electronics and transmitted to the read-out electronics which, in response to the ROI gate, terminates the integration gate. This stops the FPA from viewing the scene, thereby preventing further detection of laser pulses, and creates one discrete frame time, FR1. All laser pulse returns occuring within FR1 are read out of the FPA and stored in video memory 113. Then microprocessor 106 accesses this stored data and performs signal processing on the data. The ROI's, established by the microprocessor after processing all laser pulse returns in the first decoder gate (after acquisition), are evaluated to determine in which ROI a laser pulse occurs that corresponds to the temporal return, PN1. All regions are evaluated and when a pulse is found in an ROI, that pulse, as well as the corresponding ROI, have been correlated with the temporal return, PN1. To do this, each ROI could be evaluated sequentially on a frame by frame basis for each laser pulse detected by the photodiode detector but this process would be time-consuming and not desirable. The preferred evaluation process is evaluating multiple ROI's within a given frame time. The Amber InSb array has the capability to read 9 16×16 pixel windows at a 2 KHz rate, allowing different regions of interest to be read out for each frame time with no latency period before loading a new ROI to be evaluated.

The above evaluating and matching process is repeated on succeeding frames until all pulses detected by single PIN photodiode detector 101 have been correlated with the spatial returns on the FPA and the last pulse (as determined by traditional Hellfire SAL), indicative of the true target, has been identified with the corresponding laser return occurring in a particular ROI on the $I^2R$ FPA. Several more frames may be evaluated, looking only at the particular ROI on which the last pulse occurs, for verification and confirmation of the location of the true target. Thereafter, a track gate is generated by the microprocessor and positioned about the target location on the FPA. The missile seeker tracks this target and generates guidance commands to guide the missile to the target. The target signal may be multispectral (both 1.06 micrometers near infrared and 3–5 micrometers midwave infrared), 1.06 micrometers SAL if operating SAL mode only or $I^2R$ imagery if operating in midwave infrared mode only. However, regardless of the chosen mode of operation, the guidance commands are generated from the target position on or within the FPA. Correlation of the laser returns between the PIN detector and FPA is required only if operating in the SAL or SAL/$I^2R$ modes. If operating in an $I^2R$ mode only, correlation of the PIN and FPA returns is not required as there is no 1.06 micrometers laser return to detect. In this mode, the seeker operates strictly as an $I^2R$ imaging seeker and processes the information just like a normal $I^2R$ imaging seeker.

Figure 6:
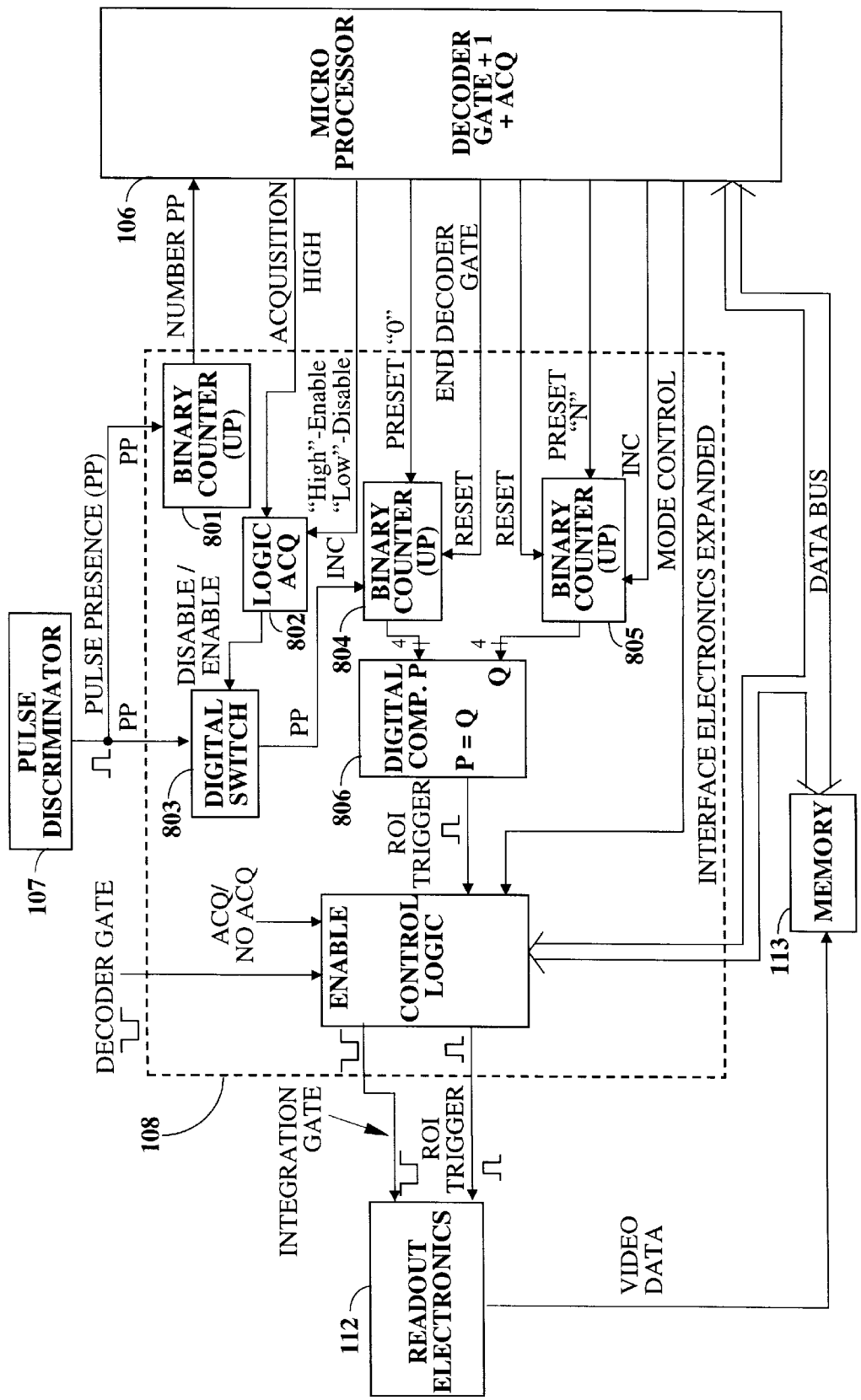
FIG. 6 depicts in detail the temporal-spatial correlation and hardware interface to implement the improved seeker.

The temporal-spatial correlation and hardware interface to implement the improved seeker is shown in greater detail in FIG. 6 where arrows denote signal paths as well as the directions.

Assuming that the traditional SAL target acquisition functions have already identified the proper last pulse to track and the decoder gate has been generated as described above, the decoder gate is sent from microprocessor 106 to control logic 807. Now, during the PIN photodiode laser target acquisition process, first binary counter 801 keeps track of all pulse presence signals received within the decoder gate and provides this information to microprocessor 106 at the end of the decoder gate. Microprocessor 106 which has temporal-spatial algorithm therein reads the first counter value and performs the correlation of the temporal PIN detector laser pulse returns with the spatial FPA laser pulse returns. After the target acquisition, the microprocessor sends an acquisition pulse to logic acquisition 802 and control logic 807. This enables the control logic to activate I²R FPA, when the next decoder gate occurs, to integrate and collect imagery during the entire decoder gate. The acquisition pulse sent to the logic acquisition 802 does not enable the logic acquisition until the second decoder gate after acquisition/no acquisition is received (decoder gate+1+ acquisition). So at the end of the first decoder gate, after PIN photodiode target acquisition, the microprocessor reads the FPA pulses stored in video memory 113 and compares these pulses with the pulse presence signals. The temporal-spatial algorithm resident in microprocessor 106 now enables logic acquisition 802 which, in turn, enables switch 803 so that during the next decoder gate, second binary counter 804 will be active and count pulse presence signals. Also, the microprocessor presets the second binary counter to a count of "0" and third binary counter 805 to a count of "1" initially. As stated before, on the next decoder gate (the third), second binary counter 804 is active and the first pulse presence signal increments the second counter to a count of one. Third binary counter 805 is preset to a count of one and digital comparator 806 compares the output of the second and third counters which are both one. Since the counter outputs are equal, the comparator sends an ROI trigger to control logic 807 which, in response, sends an ROI gate to read-out electronics 112 to stop the integration of FPA from further imagery collection. Since the termination of the integration occurred after the first pulse presence signal, only one pulse should be stored in memory 113. Microprocessor 106 compares the pulse return stored in the memory with the pulse presence signal and if a match occurs, this temporal pulse return has been correlated with the spatial pulse return. The microprocessor stores this information and resets second binary counter 804 at the end of the decoder gate. It does not reset third counter 805 but increments the third counter to a count of two. On the next decoder gate (fourth), the second counter will count two pulse presence signals. When the second counter reaches a count of two, the second and third counters will be equal and comparator 806 will, again, send an ROI trigger to control logic 807 to send the ROI gate to the read-out electronics so that the integration of the FPA can be stopped. The microprocessor will now read memory 113 and find two pulses present, the first of which already identified and a second pulse that corresponds to the second pulse presence signal. Another match has now occurred. Further, in this case, the second pulse presence signal is the last pulse indicative of the true target, therefore the correct laser pulse return to track. The last pulse has now been identified. However, it is advantageous to correlate all pulses, so the process is repeated. Next, third binary counter 805 is preset to a count of three while everything else stays the same. On the next decoder gate (fifth), second binary counter 804 will count up to three before it equals the output count of the third counter. At the third pulse presence signal, the second and third counters' output will be equal and the digital comparator 806 will generate an ROI trigger. The integration of the FPA stops and all pulses read out of the FPA are stored in memory 113. The microprocessor reads the memory and now correlates the third pulse presence signal with a pulse stored in the memory. All three pulse presence signals now have been correlated and the second pulse is determined to be the correct laser pulse return to track.

For verification of the correct laser pulse to track, the microprocessor presets the third counter to a count of two, resets the second counter to zero and the process is repeated, but now an ROI trigger is generated only when both the second and third counters equal a count of two. The ROI gate thus generated stops the FPA integration and the microprocessor looks in memory 113 to determine if a pulse has been detected by the FPA that corresponds to the second pulse presence signal. This verification process may be repeated for a few more decoder gates before the track gate is established, thereby tracking the target.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. In a seeker for locating and tracking a target in a scene by detecting and processing laser pulses reflected by the target in the scene, the seeker having semi-active laser last pulse logic circuit for determining the last pulse indicative of the true target, the circuit containing a pulse discriminator for setting a pulse detection threshold, the threshold decaying at a given constant rate, and for producing pulse presence signals in response to the detected laser pulses and a microprocessor capable of receiving and processing the pulse presence signals and producing sequential decoder gates to be used to detect the reflected laser pulses at a pre-selected pulse repetition frequency and of generating an acquisition pulse upon the location of the target by the last pulse logic; an improvement for rendering the seeker capable of processing multi-spectral target pulses, thereby achieving a more accurate target location and tracking, said improvement comprising: a single PIN detector coupled to the pulse discriminator, said detector being suitable for temporal detection of several of the 1.06 μm laser pulses reflected by the target scene; an imaging infrared focal plane array for spatial detection of several of the laser pulses reflected by the target scene, said array detecting the laser pulses for variable time durations; a video memory for storing the laser pulses detected by said focal plane array, said video memory being coupled to the microprocessor; read-out electronics coupled between said focal plane array and said video memory to relay the detected laser pulses from said array to said memory; and means for correlating the laser pulses temporally detected by said PIN detector and the laser pulses spatially detected by said array, such correlation resulting in a more accurate location and tracking of the target.

2. Seeker improvement as set forth in claim 1, wherein the single PIN photodiode detector and said focal plane array have identical field-of-view and said array is adapted to being divided into a plurality of regions-of-interest (ROI's)

to facilitate the identification of the area of said array whereon any spatially detected laser pulse impinges.

3. Seeker improvement as set forth in claim 2, wherein said correlating means comprises interface electronics, said interface electronics being coupled simultaneously to the pulse discriminator, the microprocessor and said read-out electronics, said interface electronics being adapted for generating timing signals to vary said time durations during which said focal plane array detects laser pulses and transmitting said timing signals to said read-out electronics, said read-out electronics selectively activating said array in response to said timing signals such that said array detects laser pulses reflected by the target scene during variable time durations.

4. Seeker improvement as set forth in claim 3, wherein said single PIN detector detects laser pulses of 1.06 micrometers and said focal plane array detects both pulses of 1.06 micrometers and pulses in the 3–5 micrometer range.

5. Seeker improvement as set forth in claim 4, wherein the microprocessor reads said video memory from time to time to compare the laser pulses spatially detected by said array with the pulse presence signals input from the pulse discriminator and determine whether a laser pulse was spatially detected in any ROI contemporaneously with a pre-selected temporally detected laser pulse, such contemporaneous detection indicating correlation between the spatially detected pulse and the pre-selected temporally detected pulse.

6. Seeker improvement as set forth in claim 5, wherein said interface electronics comprises a first and a second binary counters coupled to the microprocessor, said first and second counters being further adapted to count the number of pulse presence signals as the pulse presence signals are received from the pulse discriminator; a third binary counter coupled to the microprocessor, said second and third counters being set by the microprocessor at pre-determined counts, such that at the beginning of any decoder gate, said second counter is always set at a "0" and said third counter is set at a variable pre-selected positive integer; a control logic coupled to receive the acquisition pulse and the decoder gate from the microprocessor and, in response, cause said focal plane array to detect laser pulses during a given decoder gate; a switch coupled to the pulse discriminator to receive therefrom pulse presence signals, said switch being further coupled to said second counter to activate said second counter to count the pulse presence signals during a given decoder gate; a logic acquisition coupled between the microprocessor and said switch to receive the acquisition pulse from the microprocessor and, in response thereto, selectively enable said switch; and a comparator, said comparator being coupled simultaneously between said second and third binary counters and said control logic, said comparator being adapted to compare said second and third counters and generate an ROI trigger at selected times, said ROI trigger being subsequently input to said control logic wherein said trigger is used to cause the termination of the pulse detection by said focal plane array.

7. Seeker improvement as set forth in claim 6, wherein said first binary counter counts the number of pulse presence signals received from the pulse discriminator during the initial decoder gate and transmits the number to the microprocessor.

8. Seeker improvement as set forth in claim 7, wherein said comparator generates an ROI trigger when said second and third binary counters show the same count.

9. A multi-spectral method for locating and tracking a target in a scene using a seeker, said method combining the results of temporal detection and spatial detection of laser pulses reflected by the various objects in the scene, said method comprising the steps of:

i) performing temporal detection of several of the laser pulses reflected by the scene;

ii) establishing the pulse detection threshold and the decaying rate of the threshold;

iii) starting the spatial detection by a focal plane array of several of the laser pulses reflected by the scene;

iv) terminating the spatial detection when the first temporally-detected pulse is received;

v) examining the regions-of-interest of the focal plane array to determine which of the regions spatially detected a pulse contemporaneously with the temporal detection of the first pulse;

vi) restarting the spatial detection by a focal plane array from a series of individual laser pulses reflected by the scene;

vii) terminating the spatial detection when the next temporally-detected pulse is received;

viii) examining the regions-of-interest of the focal plane array to determine which of the regions spatially detected a pulse contemporaneously with the temporal detection of the next pulse;

ix) acertaining the last temporal pulse received to break the threshold, the last pulse being indicative of the target;

x) determining the region of interest on which the last pulse fell; and xi) processing the last pulse and the corresponding region of interest to generate suitable commands to guide the seeker to follow the last pulse laser spot on the corresponding region of interest on the focal plane array.

10. A method for locating and tracking a target as set forth in claim 9, wherein said determining step further comprises repeating the starting, terminating and examining steps with a pre-selected number of subsequently received temporally-detected pulses for verification of the last pulse's occurrence in the previously-determined region of interest.

* * * * *